J. C. SKEEN.
Improvement in Fly-Traps.

No. 128,982.          Patented July 16, 1872.

Witnesses.
C. F. Brown.
C. O. Brown.

John C. Skeen
Inventor.

by Geo. E. Brown,
Atty.

UNITED STATES PATENT OFFICE.

JOHN C. SKEEN, OF BARTON TOWNSHIP, INDIANA.

IMPROVEMENT IN FLY-TRAPS.

Specification forming part of Letters Patent No. 128,982, dated July 16, 1872.

I, JOHN C. SKEEN, of Barton township, Gibson county, Indiana, have invented an Improved Fly-Trap, of which the following is a specification:

This invention relates to a rectangular frame of sheet metal or other suitable material having a sliding glass cover, two transverse partitions extending from side to side of the frame and from the bottom of the same to any points sufficiently short of its top, two end pieces extending from the top of the box to points sufficiently short of the bottom, and a bottom piece extending between the two transverse partitions, the spaces between the said partitions and the end pieces having no bottoms, all for the purpose of trapping flies, as hereinafter fully described.

Figure 1:
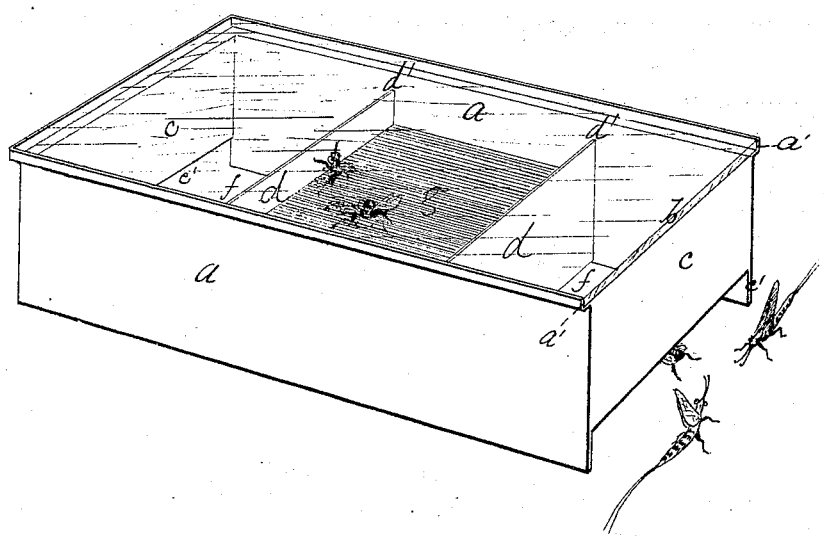
Figure 2:
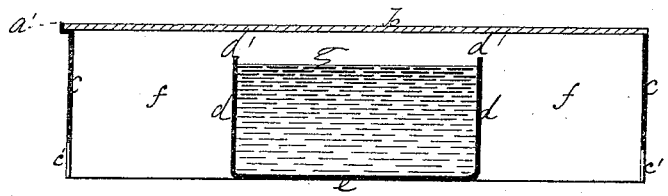

Referring to the drawing, in which Figure 1 is a perspective view, and Fig. 2 a longitudinal sectional elevation, $a$ are the side pieces of the box; $b$, the glass cover, sliding in ways $a'$ formed at the upper edges of the sides $a$; $c$, the end pieces, these being of less width than the side pieces by the width of the opening $c'$ at the bottom of the box; $d$, the transverse partitions, these being of less width than the side pieces by the width of the openings $d'$ at the top of the box. $e$ is the bottom piece, connecting the side pieces $a$ and partitions $d$, and with these forming a reservoir, $g$, for holding water; and $f$ are the spaces outside the reservoir, within the end pieces $c$.

This trap being placed on a table or other level surface, the bait is located in the spaces $f$, and the flies allured thereby pass through the openings $c'$. Having eaten their fill, they naturally fly upward toward the light, and, being arrested by the glass cover, they pass through the openings $d'$, and in their endeavors to escape most of them fall into the water in the reservoir $g$, and there perish.

I claim as my invention—

The combination of the side pieces $a$, cover $b$, end pieces $c$ having the openings $c'$, partitions $d$ having the openings $d'$, and bottom piece $e$, all arranged as specified.

JOHN C. SKEEN.

Witnesses:
 J. M. FOSTER,
 LOUIS GRIM.